P. FARLEY.

APPARATUS FOR DRYING BONE BLACK.

No. 7,266. Reissued Aug. 15, 1876.

Witnesses:
E. B. Farnum
Ph. Bottman

Inventor:
Peter Farley

UNITED STATES PATENT OFFICE.

PETER FARLEY, OF NEW YORK, N. Y.

IMPROVEMENT IN APPARATUS FOR DRYING BONE-BLACK.

Specification forming part of Letters Patent No. 113,754, dated April 18, 1871; reissue No. 7,266, dated August 15, 1876; application filed August 20, 1875.

*To all whom it may concern:*

Be it known that I, PETER FARLEY, of the city, county, and State of New York, have invented a new Improved Apparatus for Drying Bone-Black; and I do hereby declare that the following is a full, clear, and exact description thereof, reference being had to the accompanying drawings, wherein—

Figure 1:
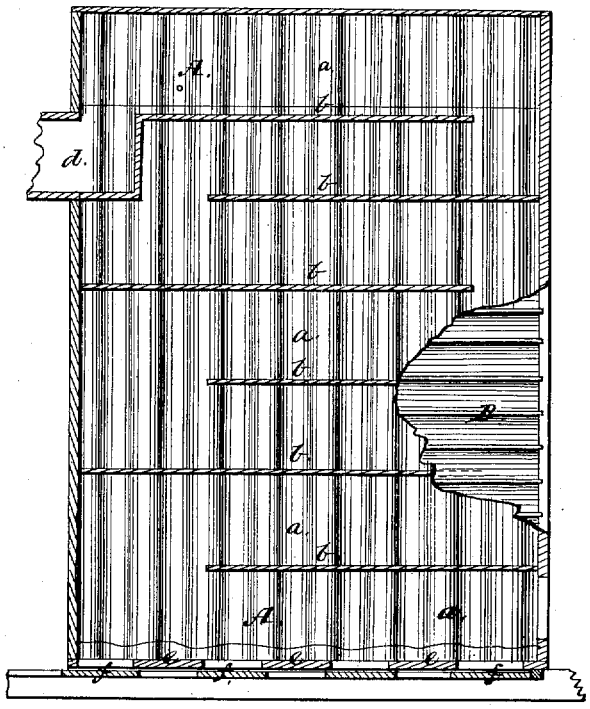
Figure 2:
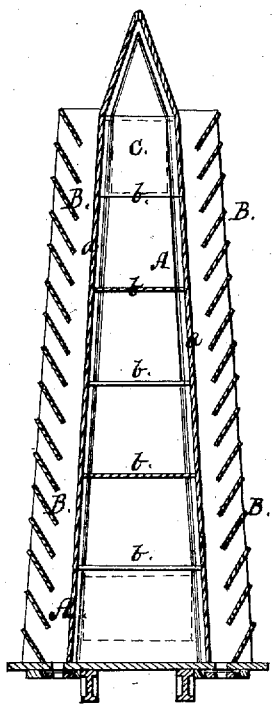
Figure 3:
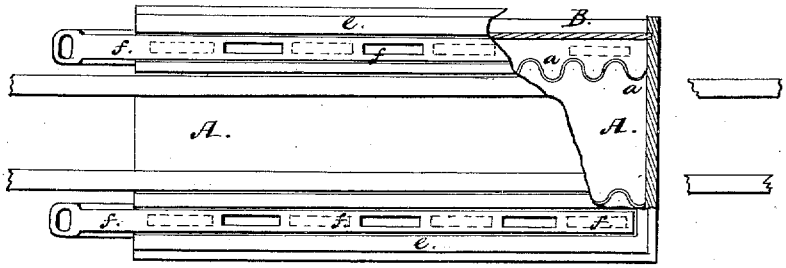

Figure 1 is a vertical longitudinal section of the apparatus. Fig. 2 is a vertical transverse section thereof. Fig. 3 is an inverted plan view, partly in section.

Similar letters of reference indicate corresponding parts.

The nature of my invention consists, first, in a drier consisting of heating and drying chambers, which is so constructed and arranged with reference to a kiln to burn the bone-black that the surplus heat from it is employed and utilized for drying purposes, and the wet bone-black is automatically dried and discharged directly into the retorts in the kiln; second, in the construction of the drying-chambers, the employment of inclined surfaces to deflect the bone-black toward and upon the heating-surfaces automatically and continuously; third, in the details of construction.

In the manufacture of sugar, the bone-black employed in clarifying is repeatedly used. For that purpose it is necessary that it should be reburned, and in order to prepare it for the retorts it is necessary to dry it.

Previous to my invention the wet bone-black has been dried by spreading it upon heated plates, on which it was stirred and turned over by manual labor. When sufficiently dried it was carried to and fed into retorts also by manual labor. This was a tedious and expensive process, and was calculated to pulverize the bone-black and destroy its value for purifying purposes.

My invention enables me to dry it much more rapidly and thoroughly, to preserve it from injury, to do it with much less labor and expense, and to utilize the entire surplus heat from the kiln in which it is subsequently burned.

For this purpose I have provided a heating-chamber, as shown by the interior lines of Fig. 2, made of metal or other suitable material, preferably with vertically-corrugated sides *a a*, which are slightly inclined, as shown in said Fig. 2. Within the heating-chamber are arranged shelves *b b*, perforated or open at alternate ends, as shown in Fig. 1. The heat from the furnace or kiln below enters the heating-chamber between the bottom and lower shelf *b*, through an orifice shown in the dotted lines in Fig. 2, and moves in a zigzag course between the shelves *b*, until it reaches the upper part, where it is discharged, by a similar orifice and vertical pipes *c*, to the chimney *d*. By this arrangement the escape of the hot air, or products of combustion, is retarded, and the maximum heating capacity of the chamber obtained. On the sides of the heating-chamber a drying-chamber is constructed by means of a suitable frame, provided with slots arranged at intervals to receive a series of slats, B B, inclined downward and toward the sides of the heating-chamber. These slats may be made with their inner edges straight or scalloped parallel with the corrugations in the sides of the heating-chamber, and extending to within a short distance of the latter. The sides of the drying-chambers, between the slats, are open to admit of the escape of the steam from the drying bone-black and the admission of air. The lower slat is continued to the bottom of the apparatus, and terminates at or near the discharge-openings, thus forming an inclined floor or bottom to deflect and discharge the dried material through said openings. The bottom of the drying-chamber is closed by flanges *e e*, which project from the heater, and are provided with lateral or longitudinal slides *f f*, whereby the apertues in the flanges are opened and closed, as desired.

The apparatus thus described is suspended, in suitable masonry or other supports, over a kiln or furnace, so that the discharge-openings will discharge the dried material automatically into the retorts or other receptacles below, and is connected with said kiln or furnace by a flue, through which the surplus heat therefrom is conveyed to the heating-chamber.

In operation, the wet bone-black is fed into the top of the drying-chamber, and by the slats is constantly and slowly deflected toward the sides of the heating-chamber (the steam escaping between the slats) until it reaches the lower slat, when it is deflected to the openings in the bottom. When sufficiently dried the slides *f* are pulled out, and the bone-black is discharged automatically in the retorts underneath. The slides are then replaced and the operation repeated.

Having described my invention, what I claim as new, and desire to secure by Letters Patent, is—

1. A drier for drying bone-black, constructed and arranged substantially as described, so as to employ and utilize the surplus heat from the kiln, and to automatically dry and discharge the bone-black, when dried, into the retorts.

2. In a drier, inclined slats or surfaces, in combination with a radiating heating-surface, constructed and arranged substantially as described, to constantly and automatically deflect the material upon the heating or radiating surfaces.

3. The inclined slats B B, applied to the heating-chamber, substantially as described.

PETER FARLEY.

Witnesses:

E. B. BARNUM,

PHILIP BOTTMAN.